2,931,741
METHOD OF IMPREGNATING WOOD WITH BETA-PROPIOLACTONE AND RESULTANT PRODUCT

Irving S. Goldstein, Pittsburgh, Pa., assignor to Koppers Company, Inc., a corporation of Delaware No Drawing. Application December 31, 1954
Serial No. 479,231

8 Claims. (Cl. 117—147)

This invention relates to the impregnation and reaction of wood with beta-propiolactone, and to the fungus-resistant, products thereby resulting, which have improved dimensional stability and are non-toxic to humans.

The term wood as used therein defines wood in the form of timber, planks, blocks, and the like which include wood cells as found in trees.

A treatment for wood which would render it fungus-resistant and dimensionally stable yet would not decrease strength or toughness and would not result in products toxic to humans has long been sought. To date, prior art processes and products in this field of endeavor leave something to be desired.

It has now been discovered that impregnation and reaction of wood cells with beta-propiolactone gives products which are fungus-resistant and have improved dimensional stability, yet have good strength and toughness and are non-toxic to humans.

The impregnation and reaction are carried out in various ways, depending upon size and form of the wood to be treated. Immersion impregnation with a solution of the lactone in an organic solvent non-reactive therewith is most generally advantageous, and it is by that method that products of most general usefulness, having a retention of at least about 10% reacted lactone are obtained. Vapor phase and liquid phase impregnation and reaction with the lactone alone are of limited value due to difficulties in their control. Well-known processes of prior evacuation followed by pressure are used with organic solutions of the lactone to facilitate impregnation and thus speed up reaction. While beta-propiolactone reacts with cellulosic hydroxyl groups at room temperature first to form carboxyethylcellulose, then to condense further with the latter, the reaction rate is too slow for general commercial application. Accordingly, the impregnating solutions are utilized at elevated temperatures, advantageously between about 56° C. and 80° C. and higher, depending upon the wood being treated, and the length of time treated to obtain a desired concentration of reacted beta-propiolactone. For the impregnation of timbers, the well-known full-cell process of impregnation is most generally advantageous, and for optimum results, a wood-swelling organic solvent is used. A wood-swelling organic solvent facilitates entry and so reaction of the lactone in the cell walls of the wood. Suitable wood-swelling solvents include acetone, methyl acetate, ethyl acetate, dioxane, dimethyl formamide, ethyl butyrate, butyl acetate and the like. Lower boiling solvents having standard boiling points up to about 110° C. are advantageously used to facilitate their subsequent evaporation. Obviously, no organic solvent is used which would react with the beta-propiolactone. Since moisture reacts with beta-propiolactone, the wood is preferably substantially dry, advantageously containing no more than about 5% moisture prior to reaction with beta-propiolactone. Higher moisture contents are wasteful of lactone impregnant. Solution concentration is varied as desired from about 10% to about 30% so as to make possible reacted retentions of about 10% to 25% and more, dry wood basis. It is found that the lactone treatment imparts a permanent swelling to wood and stabilizes it dimensionally in proportion to the amount of swelling imparted, which is varied as desired depending upon its end use. The swelling is attributed to lactone side-chain formation at the cellulose hydroxyl groups which fills up the cell walls and pushes apart the cellulose chains. Such condensed hydroxyl groups are thereafter not subject to further swelling. For most practical purposes a 25% lactone reacted wood is satisfactorily dimensionally stabilized.

The following examples illustrate the invention, percentages and parts being by weight unless otherwise indicated:

EXAMPLE 1

Yellow pine saplings cut into pieces ¾ in. x ¾ in. x 18 in. are dried at 105° C., weighted down in pans, and covered with a 10% solution of beta-propiolactone in dioxane. The pans are placed in a jacketed, vacuum-pressure treating cylinder, and a vacuum of 26 in. Hg is applied for 10 minutes followed by a pressure of 150 p.s.i. Steam is passed through the jacket to raise the treating cylinder temperature to 175° F. The treatment at 150 p.s.i. and 175° F. is continued for 6 hours. The pieces are then removed and oven-dried over night at 105° C. The average weight increase is 16.9% of the original dry wood. When a 20% solution of the lactone in dioxane is used under conditions otherwise the same, the average weight increase is 30.7% of the original dry wood. Ten pieces of each of the above impregnated samples are tested pursuant to the proposed standard method for field tests with stakes, Proc. Am. Wood-Preservers' Assoc., 49:82–86 (1953), using the test plots in South Carolina and Alabama, with good results.

EXAMPLE 2

Straight grain specimens of yellow pine ¾ in. x 1 in. x 3 in. are divided into four groups of eight. One group is retained as untreated conrols. The others are oven-dried; then one of these groups is treated with acetone alone, another group with 10% solution and the last group with 20% solution of beta-propiolactone in acetone. The treatments are carried out by weighting the specimens in pans, covering with the treating solution, and placing the pans in the treating cylinder. After a partial vacuum of 10 in. Hg for 5 minutes, a pressure of 160 p.s.i. is applied while the temperature is maintained at 170° F. for a 24 hour treatment period. The treated specimens are oven dried at 105° C. then cooled to room temperature for compression testing. Half of each group of the specimens are impregnated with water in the treating cylinder, weighed and measured radially before compression perpendicular-to-grain tests are performed using ASTM Procedure D–143–52. The treatments, moisture contents, swelling and crushing strengths of the samples are tabulated in the following Table II:

*Table II.—Effect of treatment with β-propiolactone on the crushing strength and swelling of southern yellow pine*

| Specimen Numbers | Treatment | Average Increase in Weight (Percent) | Tangential Swelling when Wet (Percent of oven-dry dimension) | Anti-Swelling Efficiency,[1] Percent | Moisture Content (Percent of dry wood) | Crushing Strength at Elastic Limit, p.s.i. |
|---|---|---|---|---|---|---|
| 1-4 | Untreated | | | | 4 | 3,450 |
| 5-8 | ----do---- | | 8.4 | | 106 | 880 |
| 9-12 | Acetone | | | | 2 | 3,600 |
| 13-16 | ----do---- | | 8.2 | | 112 | 720 |
| 17-20 | }10% β-Propiolactone in Acetone | 21 | | | 1 | 4,400 |
| 21-24 | | | 3.1 | 63 | 91 | 770 |
| 25-28 | }20% β-Propiolactone in Acetone | 48 | | | 1 | 4,050 |
| 29-32 | | | 1.6 | 81 | 83 | 900 |

[1] $ASE = \left(1 - \dfrac{\text{Percent Swelling of treated wood}}{\text{Percent Swelling of untreated control}}\right) \times 100$.

EXAMPLE 3

Straight grain specimens of yellow pine ½ in. x ½ in. x 5 in. are divided into three groups of ten. One group is retained as untreated controls. The others are oven-dried, then treated with acetone alone and with a 10% solution of beta-propiolactone in acetone, respectively. The treatments are carried out as in Example 2, and the specimens are tested for toughness on a Tinius Olsen impact testing machine using the 200 in.-lb. scale. The Charpy anvil (single beam) is used with a 4-inch span, and the specimens are broken alternately in the radial and tangential directions. Results are tabulated in following Table III.

*Table III.—Effect of treatment with β-propiolactone on the toughness of southern yellow pine*

| Specimen Numbers | Treatment | Average Increase in Weight, Percent | Moisture Content (Percent of dry wood) | Average Toughness (in.-lbs.) | | |
|---|---|---|---|---|---|---|
| | | | | Radial (Odd) | Tangential (Even) | Average |
| 1-10 | Untreated | | 5 | 81 | 67 | 74 |
| 11-20 | Acetone | 0 | 3 | 78 | 70 | 74 |
| 21-30 | 10% β-Propiolactone in Acetone | 25 | 1 | 79 | 67 | 73 |

EXAMPLE 4

Cubes of southern yellow pine sapwood, ¾ in. in dimension are treated at reflux for 24 hours with 10%, 20% and 30% solutions of beta-propiolactone in acetone. After equilibrating at 80° F. and 70% relative humidity, half the cubes from each treatment are weathered. The weathering cycle includes 87 days' exposure, 40% of the time to immersion in tap water flowing at the rate of 3 gals. per hour, 60% of the time to radiation from fluorescent "sun" and "daylight" lamps while being dried by a stream of air. After 87 days of such exposure, the weathered cubes together with the unweathered cubes are conditioned to constant weight at 80° F., 70% relative humidity. The weathered and unweathered cubes are then sterilized and exposed to four species of wood-destroying fungi, pursuant to the soil-block test procedure of Duncan and Richards, Proc. Am. Wood-Preservers' Assoc., 46:131–151 (1950). The fungi exposed to are *Lentinus lepideus* (Madison 534), *Lenzites trabea* (Madison 617), *Poria monticola* (Madison 698) and *Coniophora cerebella* (Madison 706).

Results follow in Table IV.

*Table IV.—Soil-block tests on southern yellow pine treated with β-propiolactone*

| Block No. | Treatment | Wt. Increase from Lactone Treatment (Percent of Dry Wood) | Weathered | Fungus Exposed to— | Weight Loss on Exposure (Percent of Conditioned) |
|---|---|---|---|---|---|
| 1 | None | | No | *Lentinus lepideus* (Madison 534). | 24.8 |
| 2 | ----do---- | | No | | 24.8 |
| 3 | ----do---- | | No | | 25.5 |
| 4 | ----do---- | | No | | 18.3 |
| 5 | ----do---- | | No | *Lenzites trabea* (Madison 617). | 16.5 |
| 6 | ----do---- | | No | | 15.4 |
| 7 | ----do---- | | No | | 12.0 |
| 8 | ----do---- | | No | | 12.5 |
| 9 | ----do---- | | No | *Poria monticola* (Madison 698) | 33.3 |
| 10 | ----do---- | | No | | 38.5 |
| 11 | ----do---- | | No | | 28.8 |
| 12 | ----do---- | | No | | 32.9 |
| 13 | ----do---- | | No | *Coniophora cerebella* (Madison 706). | 24.0 |
| 14 | ----do---- | | No | | 24.9 |
| 15 | ----do---- | | No | | 23.3 |
| 16 | ----do---- | | No | | 24.0 |

Table IV—(Continued)

| Block No. | Treatment | Wt. Increase from Lactone Treatment (Percent of Dry Wood) | Weathered | Fungus Exposed to— | Weight Loss on Exposure (Percent of Conditioned) |
|---|---|---|---|---|---|
| 2-7 | β-Propiolactone (10% in acetone) Average increase in weight of 10.2%. | 11.1 | No | 534 | 1.4 |
| 3-7 | | 13.7 | No | | 1.4 |
| 10-4 | | 9.5 | Yes | | 10.5 |
| 10-5 | | 10.7 | Yes | | 11.5 |
| 10-1 | | 9.6 | No | 617 | +1.6 |
| 10-2 | | 9.0 | No | | 6.8 |
| 10-6 | | 9.3 | Yes | | 22.2 |
| 15-4 | | 9.9 | Yes | | 33.3 |
| 10-3 | | 9.3 | No | 698 | 8.0 |
| 15-1 | | 9.6 | No | | 21.2 |
| 15-5 | | 8.4 | Yes | | 36.2 |
| 15-6 | | 9.7 | Yes | | 35.4 |
| 15-2 | | 9.9 | No | 706 | 11.9 |
| 15-3 | | 9.1 | No | | 15.1 |
| 4-7 | | 12.1 | Yes | | 21.3 |
| 5-7 | | 10.5 | Yes | | 23.0 |
| 6-7 | β-Propiolactone (20% in acetone) Average increase in weight of 26.5%. | 24.1 | No | 534 | 1.5 |
| 7-7 | | 24.0 | No | | 0.8 |
| 10-11 | | 27.9 | Yes | | 0.4 |
| 10-12 | | 24.8 | Yes | | 0.5 |
| 10-8 | | 24.9 | No | 617 | +0.7 |
| 10-9 | | 23.6 | No | | +1.2 |
| 10-13 | | 23.4 | Yes | | 0.9 |
| 15-11 | | 26.0 | Yes | | 0.9 |
| 10-10 | | 25.5 | No | 698 | 0.9 |
| 15-8 | | 27.4 | No | | 2.7 |
| 15-12 | | 25.7 | Yes | | 4.0 |
| 15-13 | | 25.9 | Yes | | 5.2 |
| 15-9 | | 25.6 | No | 706 | +0.7 |
| 15-10 | | 28.3 | No | | +0.4 |
| 8-7 | | 25.8 | Yes | | 0.2 |
| 9-7 | | 29.6 | Yes | | 0.4 |
| 2-20 | β-Propiolactone (30% in acetone) Average increase in weight of 45.6%. | 44.6 | No | 534 | +0.5 |
| 10-7 | | 44.6 | No | | 0.2 |
| 10-17 | | 39.1 | Yes | | 0.2 |
| 10-18 | | 39.9 | Yes | | +0.2 |
| 10-14 | | 41.8 | No | 617 | +0.5 |
| 10-15 | | 38.6 | No | | +0.6 |
| 10-19 | | 40.5 | Yes | | 0.0 |
| 15-17 | | 47.6 | Yes | | 1.0 |
| 10-16 | | 40.9 | No | 698 | 0.9 |
| 15-14 | | 51.0 | No | | 2.7 |
| 15-18 | | 46.3 | Yes | | 1.8 |
| 15-19 | | 43.2 | Yes | | 1.6 |
| 15-15 | | 45.4 | No | 706 | +0.6 |
| 15-16 | | 47.7 | No | | 0.0 |
| 15-7 | | 49.6 | Yes | | 0.6 |
| 15-20 | | 54.3 | Yes | | 0.8 |

What is claimed is:

1. Process for rendering wood fungus-resistant which comprises reacting said wood with at least about 10% beta-propiolactone based on the weight of said wood, said beta-propiolactone being dissolved in a wood swelling organic solvent.

2. A fungus-resistant wood reacted with at least about 10% beta-propiolactone based on the weight of said wood, said beta-propiolactone being dissolved in a wood swelling organic solvent.

3. Process for rendering wood fungus-resistant which comprises reacting said wood with a wood swelling organic solvent solution of beta-propiolactone to give a non-volatile weight increase of at least about 10% and removing the solvent.

4. Process of claim 3 in which the solution contains from about 10% to about 30% beta-propiolactone.

5. Process for rendering wood fungus-resistant which comprises reacting the wood with a wood swelling organic solvent solution of beta-propiolactone introduced by the full-cell process of impregnation to a non-volatile weight increase of at least 10% and removing the solvent.

6. The method of rendering wood stable and fungus-resistant which comprises dissolving beta-propiolactone in an organic wood swelling solvent so that the resulting solution contains from about 10 percent to about 30 percent of beta-propiolacetone, impregnating said dissolved beta-propiolactone into said wood, and drying said wood.

7. The method as defined in claim 6 in which said beta-propiolactone is impregnated into said wood in amounts sufficient to yield a weight increase of at least about 25% wood basis.

8. The method as defined in claim 7 in which said beta-propiolactone is impregnated in said wood at temperatures ranging between about 56° to 80° C. and at superatmospheric pressures.

References Cited in the file of this patent

UNITED STATES PATENTS

| | | |
|---|---|---|
| 1,274,171 | Landau | July 30, 1918 |
| 2,650,885 | Hudson | Sept. 1, 1953 |
| 2,721,784 | Daul | Oct. 25, 1955 |

OTHER REFERENCES

Daul: "Reaction of Cotton with Beta-Propiolactone in the Presence of Organic Solvents," Textile Research U., vol. XXIV, No. 8, August 1954, pages 738–747.